July 21, 1942.   H. E. VAN NESS ET AL   2,290,395
THREAD MILLING MACHINE
Filed Sept. 26, 1940   2 Sheets-Sheet 1
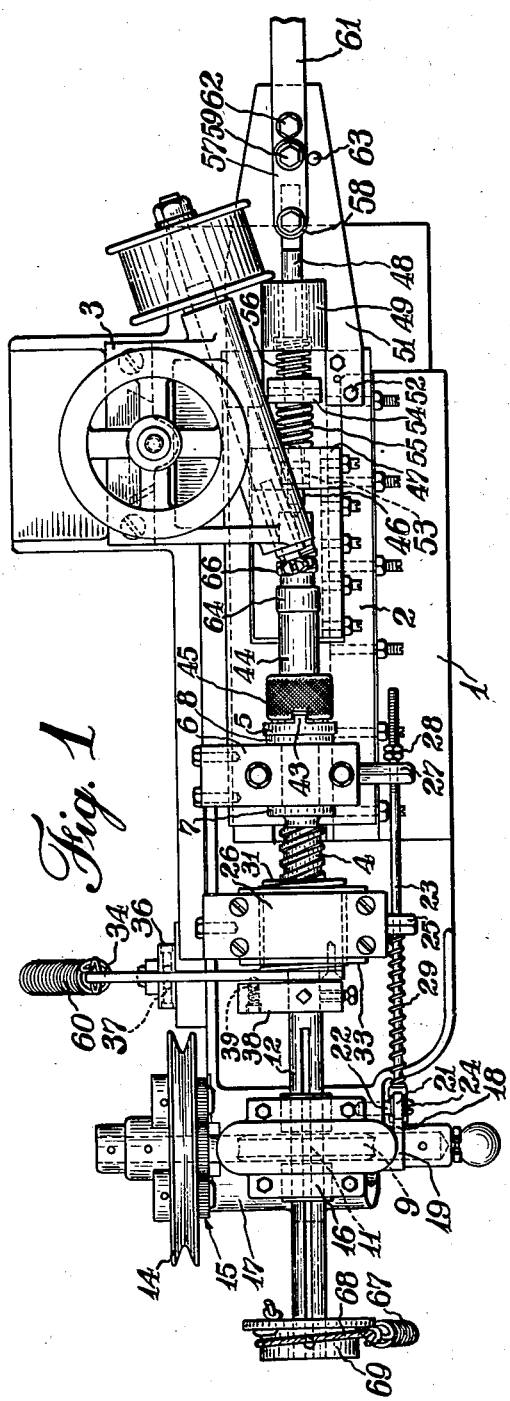
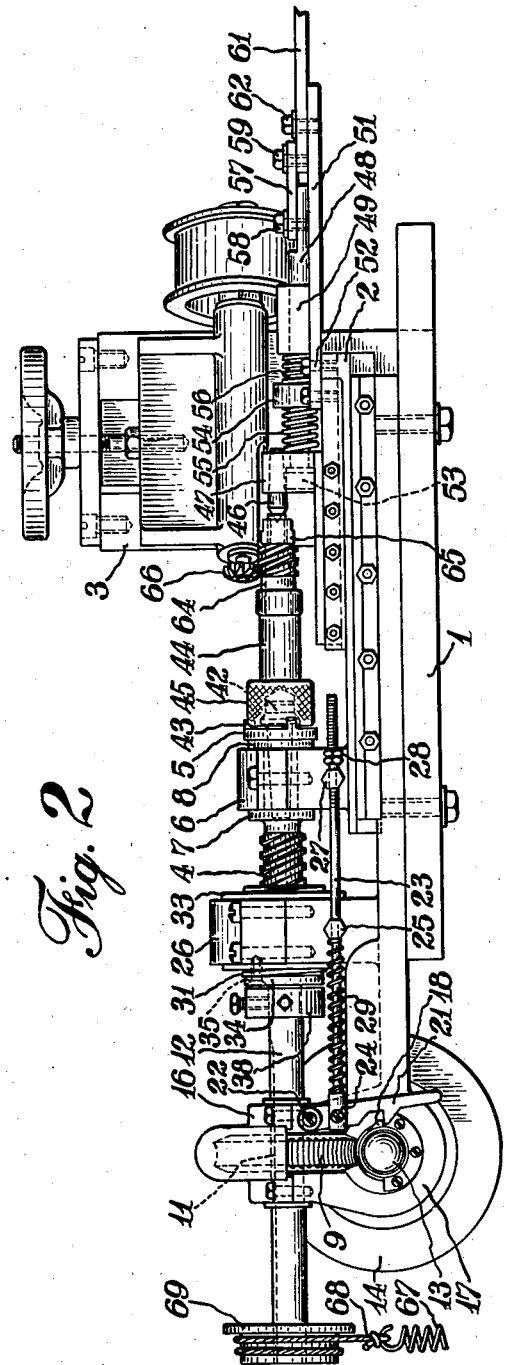
INVENTOR.
Henry E. Van Ness
BY Andrew B. Lamoreaux
Clinton S. James.
ATTORNEY.
Witness:
Burr W. Jones July 21, 1942.  H. E. VAN NESS ET AL  2,290,395

THREAD MILLING MACHINE

Filed Sept. 26, 1940  2 Sheets-Sheet 2

Witness:
Burr W. Jones

INVENTOR.
Henry E. VanNess and
BY Andrew B. Lamoreaux
Clinton S. Janes
ATTORNEY.

Patented July 21, 1942

2,290,395

UNITED STATES PATENT OFFICE 2,290,395

THREAD MILLING MACHINE

Henry E. Van Ness and Andrew B. Lamoreaux, Elmira, N. Y., assignors to Bendix Aviation Corporation, South Bend, Ind., a corporation of Delaware Application September 26, 1940, Serial No. 358,500

14 Claims. (Cl. 10—154)

The present invention relates to a thread milling machine and more particularly to a machine for milling multi-lead threads on a screw shaft with provision for easy entrance of a nut on said threads.

In certain forms of engine starter gearing, a shaft is provided having a threaded portion and a plain portion, and a nut is arranged to bear normally on the plain portion but to enter the threads and be traversed thereby upon rotation of the screw shaft. When standard forms of threads are used on the screw shaft, some difficulty is encountered in securing at all times proper engagement of the nut with the threads. It has been found possible to overcome this difficulty by enlarging the thread spaces adjacent the ends of the threads, this enlargement being preferably effected by removal of metal from the non-pressure sides of the threads in order to leave the pressure sides of the threads intact.

It is an object of the present invention to provide a novel method of milling threads with a variable pitch adjacent the ends of the threads in order to increase the entrance space between the threads.

It is another object to provide a novel thread milling machine which accomplishes automatically the operation set forth in an efficient and economical manner.

It is another object to provide such a device incorporating a master screw shaft and nut for controlling the rotation and traversal of a blank in engagement with a milling cutter.

It is another object to provide such a device in which the control nut is provided with a second thread of lower pitch which is made effective to control the motion of the blank when the cutter approaches the end of the threads thereon.

It is another object to provide such a device incorporating novel means for stopping the motion of the blank and cutting off the power from the milling machine when the cut is completed, and for returning the master screw shaft and nut to normal position.

It is another object to provide such a device incorporating novel means for holding the work and for securing accurate indexing of the work when multi-lead threads are cut.

Further objects and advantages will be apparent from the following description taken in connection with the accompanying drawings in which:

Fig. 1 is a top plan view of a milling machine incorporating a preferred embodiment of the invention, showing the parts in the positions assumed at the time of changing the pitch of the thread;

Fig. 2 is a side elevation of the same;

Figure 3:
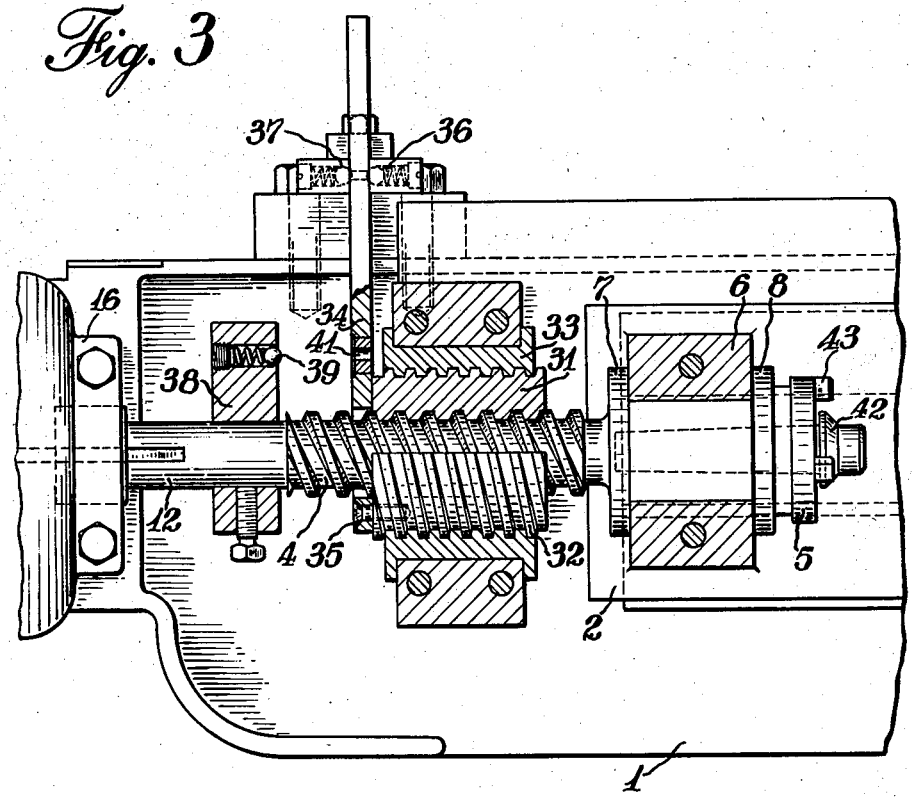
Fig. 3 is an enlarged detail showing the master screw shaft, nut and associated parts in normal or idle position.

In Figs. 1 and 2 of the drawings there is illustrated a milling machine comprising a fixed bed plate 1 having a horizontally movable work holding slide 2 and a vertically and laterally adjustable tool holder slide 3.

A master screw shaft 4 of the pitch desired for the threads to be milled, is provided with a driving head 5 which is journalled in a bearing 6 fixed to the work holder slide. Flanges 7 and 8 on the drive head 5 are arranged to bear on the ends of the bearing 6 whereby longitudinal motion of the screw shaft and drive head is imparted to the bearing and consequently to the work holder slide.

Means for rotating the master screw shaft 4 while permitting longitudinal movement thereof is provided in the form of a worm gear 9 splined as indicated at 11 on an extended portion 12 of the screw shaft and arranged to be driven by a worm 13 actuated from a drive pulley 14 by means of reduction gearing indicated generally at 15. Worm gear 9 is supported in a bearing 16 fixed to the bed plate 1, and the worm 13, pulley 14 and gearing 15 are mounted in a cradle 17 which is pivoted on the bed plate 1 on an axis substantially in the plane of the pulley 14 whereby the worm 13 may swing vertically into and out of engagement with the worm wheel 9.

Means for latching the worm 13 in engagement with the worm wheel 9 is provided in the form of a lug 18 extending laterally from an outboard bearing 19 for the worm and a latch 21 pivoted at 22 to the worm wheel bearing 16 in position to engage under the lug 18 and hold the worm in operative position.

Means for controlling the latch is provided in the form of a rod 23 pivoted at 24 to the latch, slidably mounted in a stud 25 extending laterally from a bearing member 26 fixed to the bed plate 1, and extending through a stud 27 mounted on the side of the bearing 6 of the work holder slide 2. Nuts 28 are adjustably mounted on the end of the rod 23 in position to be engaged by the stud 27 as the work holder slide approaches the end of its traversal whereby final movement of the work holder slide actuates the rod 23 to withdraw the latch 21. Means normally holding the latch in engaging position is provided in the form of a compression spring 29 mounted on the rod 23 and bearing against the fixed stud 25.

Means for causing traversal of the master screw shaft 4 and consequently of the work holder slide 2 as the master screw shaft is rotated, is provided in the form of a master nut 31 threaded on the master screw shaft 4. As shown in Fig. 3, the nut 31 is provided with an external thread 32 of lower pitch than the thread of the master screw shaft. The master nut 31 is rotatably mounted in a threaded bearing member 33 fixedly mounted in the bearing 6 of the work holder slide.

Means for normally holding the master nut 31 from rotation is provided in the form of a lever arm 34 fixed as indicated at 35 to said nut and having its free end resting in an abutment member 36, in which position it is normally maintained by detent means 37.

Means for coupling the master nut 31 to the master screw shaft 4 for rotation and longitudinal movement in unison, is provided in the form of a collar 38 fixed on the screw shaft in position to engage the change lead lever 34 after a predetermined longitudinal movement of the screw shaft through the nut 31. A detent 39 is preferably provided in the collar 38 in position to engage in an opening 41 in the change lead lever 34 in order to secure uniformity in the angular relationship of the collar and lever when they are clutched together.

The drive head 5 is provided with a live center 42 and with one or more drive lugs 43. A work holding arbor 44 (Figs. 1 and 2) is arranged to be supported at one end on the live center 42 and is provided with one or more notches 45 adapted to receive the driving lugs 43. The number of notches 45 corresponds to the number of leads in the thread to be milled. In the present case, a three-lead thread is illustrated as being milled; consequently, there are three notches in the end of the arbor 44.

The opposite end of the arbor is supported by a dead center 46 fixed in a tail stock 47 which is slidably mounted on the work holder slide 2. Means are provided for sliding the tail stock on the work holder slide in order to permit removal and replacement of the work holding arbor 44 and for pressing the dead center against the arbor with a substantially constant pressure during operation of the milling machine. As here shown, this means is in the form of a shaft 48 slidably mounted through a bearing 49 on a yoke 51 fixed as indicated at 52 on the work holder slide 2. Shaft 48 extends through the tail stock 47 and is provided with a head 53 arranged to bear against the tail stock and withdraw it from operative position when the shaft is withdrawn. Shaft 48 is provided intermediate its length with a fixed abutment 54, and a compression spring 55 is confined between said abutment and the tail stock 47 whereby sliding movement of shaft 48 to the left is yieldably transmitted to the tail stock through the spring 55 to force the dead center 46 against the arbor 44. A lighter compression spring 56 is mounted on the shaft 48 between the abutment 54 and the bearing 49 whereby the shaft 48 is biased toward operative position by spring 56. Toggle means for actuating the shaft 48 is provided in the form of a link 57 pivoted at 58 to the shaft 48 and at 59 to the end of a lever 61. Lever 61 is pivoted at 62 to the yoke 51. The arrangement of the toggle so formed is such that when the pivots 58, 59 and 62 are in alinement, the shaft 48 is advanced sufficiently to apply the desired pressure to the tail stock through the spring 55, which pressure is thus substantially uniform. A pin 63 is preferably provided in the yoke 51 to act as a stop for the toggle in operative position.

The blank 64 to be milled is clamped on the arbor 44 as by means of a clamp nut 65, and a milling cutter 66 of suitable form is rotatably mounted in the tool holder slide 3 in position to engage the work and form a thread groove thereon as the work is traversed and rotated under the control of the master screw 4.

A spring 60 is provided for returning the change lead lever 34 to idle position, and a spring tension device comprising a spring 67 and a flexible cord 68 is arranged to operate on a pulley 69 fixed to the extension 12 of the master screw shaft in order to rotate the screw shaft back to its starting position.

In operation, when the worm 13 is disconnected from the worm wheel 9 and the machine is thus disconnected from its power supply, the operator places an arbor 44, with a blank 64 mounted thereon, on the live center in position to be coupled to the drive head 5. He then manipulates the lever 61 to compress the spring 56 and back away the tail stock 47 so as to permit the arbor to be positioned on the dead center 46. The toggle lever 61 is then manipulated to straighten the toggle, whereupon the work is clamped in position by pressure of the spring 55 against the tail stock 47.

Figure 4:
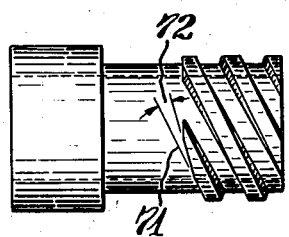
Fig. 4 is a side elevation of one form of screw shaft as threaded according to the method herein disclosed.

The worm 13 is thereupon moved into engagement with the worm wheel 9 by the operator, whereupon rotation of the worm wheel is transmitted to the master screw shaft 4, and since the master nut 31 is held stationary by the arm 34, the screw shaft and the work holder slide with the parts mounted thereon are moved longitudinally while the arbor 44 is rotated. The longitudinal movement of the arbor 44 brings the blank 64 into engagement with the milling cutter 66 which thereupon cuts a thread groove in the work, the pitch of which is identical with the pitch of the master screw 4. When the operation has progressed to the point where the cutter 66 begins to run out of the work as shown in Figs. 1 and 2, the collar 38 comes into engagement with the change lead lever 34, thus coupling the nut 31 to the screw shaft 4. The further traversal of the screw shaft and work holder slide is then governed by the pitch of the external threads of nut 31 as it rotates in the fixed bearing 33, and since this pitch is lower than the pitch of the screw shaft 4, the traversal of the work is slower and the cutter 66 forms a taper on the ends of the threads of the work as illustrated at 71 in Fig. 4. The angle of this taper as shown at 72 is determined by the difference between the pitches of the internal and external threads of the master nut 31.

When the cut is completed, the latch 21 is withdrawn by engagement of the stud 27 on the work holder slide with the nuts 28 on the rod 23. The worm is thereupon released from the worm wheel 9 and the machine stops. The operator then actuates the toggle lever 61 to release the work arbor, whereupon it is rotated by the operator to index it into position for the next cut, where it is held by means of the lug and slot connection 43, 45. The work is then again clamped in position by operation of the toggle and the second cut made as previously described. After all the leads of the thread have been cut, the arbor is taken from the machine, the work is removed therefrom and replaced by a new blank, and the operation repeated.

Although but one form of the invention has been shown and described in detail, it will be understood that other forms are possible and various changes may be made in the design and arrangement of the parts without departing from the spirit of the invention as defined in the claims appended hereto.

What is claimed is:

1. In a thread milling machine, a rotating cutter, means for holding the work in engagement with the cutter including a drive head and tail stock, means for traversing and rotating the drive head at a fixed ratio of traversal to rotation to cause the cutter to form a thread groove in the work, and means for automatically changing the ratio of traversal to rotation of the drive head to change the pitch of the thread groove without interrupting the milling operation as the cutter approaches the end of the thread on the work.

2. In a thread milling machine, a rotating cutter, means for holding the work in engagement with the cutter including a drive head and tail stock, means for traversing and rotating the drive head at a fixed ratio of traversal to rotation to cause the cutter to form a thread groove in the work including a rotatable screw shaft and a nut mounted in a fixed bearing member, and means for automatically changing the rate of traversal of the driving head as the cutter approaches the end of the thread on the work while maintaining constant the rotation of the drive head and without interrupting the milling operation.

3. In a thread milling machine, a rotating cutter, means for holding the work in engagement with the cutter including a drive head and tail stock, means for traversing and rotating the drive head to cause the cutter to form a thread groove in the work including a rotatable screw shaft, a nut threaded thereon and a fixed threaded bearing for the nut, means normally preventing rotation of the nut, and means for causing rotation of the nut in the threaded bearing to change the pitch of the thread groove as the cutter approaches the end of the thread on the work.

4. In a thread milling machine, a base, a milling cutter rotatable in a bearing on the base, a work holder slidably mounted on the base, a driving head journalled on the work holder slide, screw means for rotating the drive head and traversing the head and slide, a second screw means of lower pitch for traversing the slide at a reduced speed, and means for automatically bringing the traversing means of lower pitch into operation as the slide approaches the end of its stroke without interrupting the milling operation.

5. In a thread milling machine, a base, a milling cutter rotatable in a bearing on the base, a work holder slidably mounted on the base, a driving head journalled on the work holder slide, a screw shaft fixed to the driving head, means for rotating the screw shaft, an internally and externally threaded nut on the screw shaft, a fixed threaded bearing for the nut, means normally holding the nut from rotation, and means for locking the nut to rotate with the screw shaft after a predetermined movement thereof.

6. In a thread milling machine, a base, a milling cutter rotatable in a bearing on the base, a work holder slidably mounted on the base, a driving head journalled on the work holder slide, a screw shaft fixed to the driving head, means for rotating the screw shaft, a nut threaded on the screw shaft having a second thread of shorter lead than the screw shaft, a fixed bearing threaded to cooperate with the second thread of the nut, a detent opposing rotation of the nut, and means for connecting the nut for rotation with the screw shaft after a predetermined rotation thereof.

7. A thread milling machine comprising a drive gear, a screw shaft splined therein, a drive head fixed to the screw shaft, a nut threaded on the screw shaft, a fixed bearing in which the nut is threaded with a lower lead than that of the screw shaft, an arm fixed to the nut, detent means normally preventing rotation of the arm, and a coupling member fixed on the screw shaft arranged to engage the arm to couple the nut to the screw shaft.

8. A thread milling machine comprising a drive gear, a screw shaft splined therein, a drive head fixed to the screw shaft, a nut threaded on the screw shaft, a fixed bearing in which the nut is threaded with a lower lead than that of the screw shaft, detent means normally preventing rotation of the nut, means for coupling the nut to the screw shaft after a predetermined traversal of the shaft through the nut, disconnectable drive means for the gear, means for disconnecting the drive after a predetermined traversal of the screw shaft, and means for thereafter returning the screw shaft and nut to idle position.

9. A thread milling machine comprising a drive gear, a screw shaft splined therein, a drive head fixed to the screw shaft, a nut threaded on the screw shaft, a fixed bearing in which the nut is threaded with a lower lead than that of the screw shaft, detent means normally preventing rotation of the nut, means for coupling the nut to the screw shaft after a predetermined traversal of the shaft through the nut, a pivoted drive worm, a latch normally holding the worm in engagement with the gear, means actuated by the drive head at the end of its longitudinal movement for releasing the latch, and spring means for thereafter rotating the screw shaft back to normal position.

10. In a thread milling machine, a work holder slide, a drive head journalled thereon, means for rotating the drive head and simultaneously traversing the work holder slide, a tail stock slidably mounted on the work holder having a dead center fixed thereon, a work holding arbor adapted to be coupled to the drive head, and spring toggle means for sliding the tail stock on the work holder slide to press the dead center into engagement with the arbor with a substantially uniform pressure.

11. In a thread milling machine, a screw shaft having a driving head for a work holding arbor, means for rotating the screw shaft while permitting longitudinal movement thereof, a nut threaded on the screw shaft, a fixed bearing in which said nut is threaded with a lower pitch than the screw shaft, means normally holding the nut stationary, and a clutch member fixed on the screw shaft adapted to lock the nut to the screw shaft after a predetermined longitudinal movement of the screw shaft.

12. In a thread milling machine, a screw shaft, disconnectable gearing for rotating the screw shaft while permitting longitudinal movement thereof, a nut threaded on the screw shaft provided with an external thread of substantially lower pitch, a fixed bearing into which the nut is threaded, a work holding arbor connected for rotation and traversal with the screw shaft, means normally holding the nut from rotation whereby rotation of the screw shaft causes traversal thereof, means for locking the nut to the screw shaft after a predetermined traversal thereof whereby rotation of the nut in its bearing causes traversal of the screw shaft and nut at a lower speed, and means for disconnecting the gearing and returning the nut and screw shaft to normal position.

13. In a thread milling machine, a drive head, a work holding arbor coupled at one end thereto, a slidably mounted tail stock, a dead center fixed therein supporting the other end of the arbor, and means for pressing the tail stock to hold the dead center against the arbor including a slidably mounted shaft and an abutment thereon, a compression spring between the abutment and the tail stock, and manually operable means for moving the shaft to a predetermined position to compress the spring against the tail stock.

14. In a thread milling machine, a drive head, a work holding arbor coupled at one end thereto, a slidable tail stock, a dead center therein supporting the other end of the arbor, and means for pressing the tail stock against the arbor with a substantially constant pressure including a slidably mounted shaft, an abutment thereon, a compression spring on the shaft between the abutment and the tail stock, and toggle means for moving the shaft to a predetermined position with respect to the tail stock to compress the spring against the tail stock.

HENRY E. VAN NESS.
ANDREW B. LAMOREAUX.